(12) United States Patent
Klein

(10) Patent No.: US 9,300,666 B2
(45) Date of Patent: Mar. 29, 2016

(54) DETECTING PROXY-BASED COMMUNICATION

(71) Applicant: International Business Machines Corporation, Armonk, NY (US)

(72) Inventor: Amit Klein, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/327,792

(22) Filed: Jul. 10, 2014

(65) Prior Publication Data

US 2016/0014125 A1    Jan. 14, 2016

(51) Int. Cl.
| | |
|---|---|
| H04L 29/06 | (2006.01) |
| H04L 12/26 | (2006.01) |
| H04L 29/12 | (2006.01) |
| G06F 7/04 | (2006.01) |
| G06F 15/16 | (2006.01) |
| G06F 17/30 | (2006.01) |

(52) U.S. Cl.
CPC .......... *H04L 63/0884* (2013.01); *H04L 43/065* (2013.01); *H04L 61/1511* (2013.01); *H04L 61/6013* (2013.01); *H04L 63/0281* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 7,296,288 B1 * | 11/2007 | Hill et al. ........................... 726/2 |
| 7,661,136 B1 * | 2/2010 | Spielman ........................ 726/22 |
| 7,930,746 B1 * | 4/2011 | Sheleheda et al. .............. 726/23 |
| 8,122,082 B2 * | 2/2012 | Klein ............................ 709/203 |
| 2003/0217173 A1 * | 11/2003 | Butt et al. ...................... 709/237 |
| 2009/0089857 A1 * | 4/2009 | Sabin et al. ......................... 726/1 |
| 2012/0278889 A1 * | 11/2012 | El-Moussa ....................... 726/23 |
| 2014/0379902 A1 * | 12/2014 | Wan et al. ..................... 709/224 |
| 2015/0193781 A1 * | 7/2015 | Dave et al. ....................... 725/53 |

OTHER PUBLICATIONS

"De-anonymizing Tor and Detecting Proxies"; De-anonymizing Tor and Detecting Proxies ha.ckers.or web applicati . . . ; Printed Apr. 30, 2014; Copyright 2001-2014; <http://ha.ckers.org/blog/20070926/de-anonymizing-tor-and-detecting- . . . >.

Law, Eric; "SOCKS Proxies in Internet Explorer"; SOCKS Proxies in Internet Explorer—IEInternals—Site Home—MS . . . ; Printed Apr. 30, 2014; <http://blogs.msdn.com/b/ieinternals/archive/2010/10/08/socks-proxy- . . . >.

"Network.proxy.socks remote dns"; mozillaZine; Network.proxy.socks remote dns—MozillaZine Knowledge Base; Printed Apr. 30, 2014; Copyright 1998-2007; <http://kb.mozillazine.org/Network.proxy.socks_remote_dns>.

"SOCKS"; Wikipedia, the free encyclopedia; Printed Apr. 30, 2014; <http://en.wikipedia.org/wiki/SOCKS>.

"Bug 134105—SOCKS5: DNS lookups (host resolving) should occur on proxy, not client side"; Printed Apr. 30, 2014; <https://bugzilla.mozilla.org/show_bug.cgi?id=134105>.

* cited by examiner

*Primary Examiner* — Shin-Hon Chen

(74) *Attorney, Agent, or Firm* — Gilbert Harmon, Jr.; Jason Sosa

(57) ABSTRACT

Detecting proxy-based communications via a computer network by sending a uniform resource locator via a computer network to a recipient at a first computer network address, identifying a request associated with the uniform resource locator, where the request is associated with a second computer network address, and determining that a value of a characteristic of the second computer network address is inconsistent with a value associated with the recipient, thereby identifying the first computer network address as being associated with a proxy.

15 Claims, 3 Drawing Sheets

DETECTING PROXY-BASED COMMUNICATION

BACKGROUND OF THE INVENTION

The present invention relates generally to computer security, and more particularly, to identification of proxy-based communication to a computer system.

In computer networks, a proxy server is a server (a computer system or an application) that acts as an intermediary for requests from clients seeking resources from other computing devices. A client connects to the proxy server, requesting some service, such as a file, connection, web page, or other resource available from a different server and the proxy server evaluates the request as a way to simplify and control its complexity. Many proxies are web proxies, facilitating access to content on the World Wide Web and providing anonymity for the client. Often, proxies reside at various points between the client's computer and a destination servers on the Internet.

SUMMARY

In one aspect of the invention a method is provided for detecting proxy-based communications via a computer network, the method includes sending a uniform resource locator via a computer network to a recipient at a first computer network address, identifying a request associated with the uniform resource locator, where the request is associated with a second computer network address, and determining that a value of a characteristic of the second computer network address is inconsistent with a value associated with the recipient, thereby identifying the first computer network address as being associated with a proxy.

In other aspects of the invention, systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Embodiments of the present invention recognize that fraudulent use of computer network-based software applications, such as online banking applications, frequently involves a perpetrator performing a transaction via an intermediate computer, or "proxy," in order to obscure the true origin of fraudulent transaction. Embodiments of the present invention provide the ability to identify aspects associated with an origin computer initiating access and/or communication, and compare those aspects to aspects of a computer from which the access attempt/request was directly received, to determine whether a proxy is being used.

Figure 1:
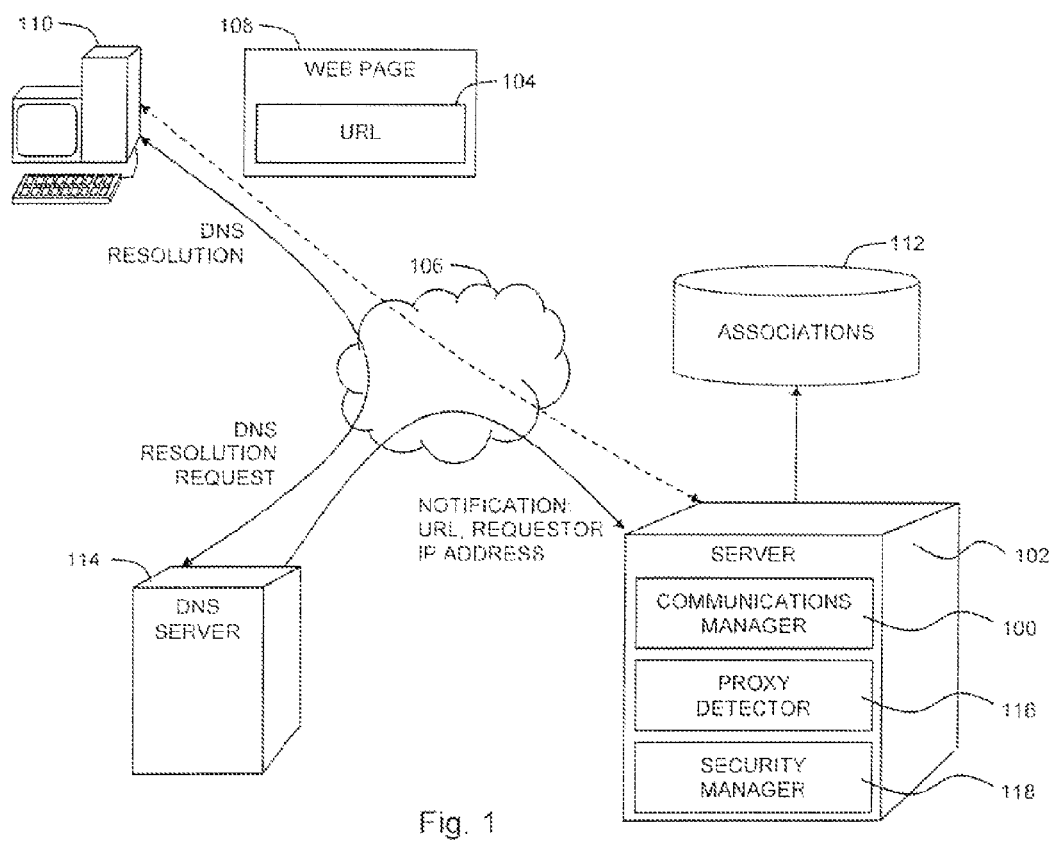
FIG. 1 is a simplified conceptual illustration of a system for detecting proxy-based communications via a computer network, constructed and operative in accordance with an embodiment of the invention.

Reference is now made to FIG. 1 which is a simplified conceptual illustration of a system for detecting proxy-based communications via a computer network, constructed and operative in accordance with an embodiment of the invention. In the system of FIG. 1, a communications manager 100, such as may be hosted by a server computer 102, is configured to send a uniform resource locator (URL) 104 to a recipient at a destination computer network address, via a computer network 106, such as the Internet. Communications manager 100 may, for example, provide URL 104 within Hypertext Markup Language (HTML) or JavaScript™ instructions that are embedded within a web page 108 that communications manager 100 provides to a client computer 110, such as part of a banking transaction, where client computer 110 is configured to process URL 104 in accordance with conventional techniques.

Where communications received by communications manager 100 from client computer 110 indicate a source computer network address of client computer 110, communications manager 100 preferably uses the source computer network address as the destination computer network address for communications that communications manager 100 sends to client computer 110. For example, where client computer 110 sends packet-based communications in accordance with the Transmission Control Protocol/Internet Protocol (TCP/IP), each packet that client computer 110 sends indicates a source IP address of the packet, to which responses to such communications are to be addressed. However, if client computer 110 is communicating via a proxy, the source computer network address of communications received by communications manager 100 from client computer 110 would be the computer network address of the proxy, and not the computer network address of client computer 110. Thus, the connection between client computer 110 and server computer 102 is shown in dashed lines to indicate that it is not known if communications manager 100 is communicating directly with client computer 110 or if communications manager 100 is communicating with client computer 110 via a proxy.

Communications manager 100 is preferably configured to maintain an association between a hostname portion of URL 104 and its intended recipient, such as in an associations database 112. Preferably, communications manager 100 configures the hostname portion of URL 104 to include an identifier that uniquely identifies the recipient, such as by identifying a client session, a client device, and/or an account that is associated with the recipient.

A domain name system (DNS) server 114, which may be hosted by server computer 102, is configured in accordance with conventional techniques to receive and respond to a request to resolve the hostname portion of URL 104, such as where the request is sent by client computer 110 after client computer 110 receives URL 104 from communications manager 100 as described above. DNS server 114 is also preferably configured to send a notification to communications manager 100 in response to receiving the request, where the notification indicates that the request was made. The notification preferably includes the hostname portion of URL 104, or at least the portion of the hostname that identifies its intended recipient as described above. The notification also preferably includes a source computer network address included in the request, where the source computer network address indicates the computer network address of the requestor.

A proxy detector 116, which may be hosted by server computer 102, is configured to identify a request associated with URL 104, such as by receiving the notification described above, and thereby identify the original recipient of URL 104, such as by querying associations database 112 using information regarding URL 104 that is included in the request. Proxy detector 116 is preferably configured to determine that a value of a characteristic of the computer network address to which URL 104 was originally sent by communications manager 100 is inconsistent with a value associated with the recipient, and thereby identify the computer network address to which URL 104 was originally sent as being associated with a proxy that is forwarding communications to and from client computer 110. Thus, for example, proxy detector 116 determines, using conventional techniques, the geolocation associated with the computer network address of the recipient to which URL 104 was originally sent by communications manager 100, as well as the geolocation associated with the source computer network address included in the request for DNS resolution of the hostname portion of URL 104, and compares their geolocations. If the geolocations are associated with different countries, or are separated by a predefined minimum distance, proxy detector 116 may identify the computer network address to which URL 104 was originally sent as being associated with a proxy.

Additionally or alternatively, proxy detector 116 determines, using conventional techniques, address ownership information, domain level information, and/or any other known type of information associated with the computer network addresses of the recipient and the requestor, compares the information, and identifies the computer network address to which URL 104 was originally sent as being associated with a proxy if the information associated with the original recipient of URL 104 is inconsistent with the information associated with the requestor that made the request for DNS resolution of the hostname portion of URL 104, where their consistency is measured in accordance with predefined criteria, such as whether they indicate the same or different ownership or the same or different domain.

Additionally or alternatively, proxy detector 116 is configured to identify the computer network address to which URL 104 was originally sent as being associated with a proxy if the source computer network address included in the request for DNS resolution of the hostname portion of URL 104 is inconsistent with one or more computer network addresses associated with one or more previous requests to resolve hostnames of URLs that were previously provided to the same recipient, such as using the above predefined criteria.

A security manager 118, which may be hosted by server computer 102, is configured to subject requests received from client computer 110 to one or more predefined security measures in response to determining that client computer 110 is communicating via a proxy, such as by subjecting such requests to further scrutiny, curtailing the requests, or preventing the requests from being serviced.

Figure 2:
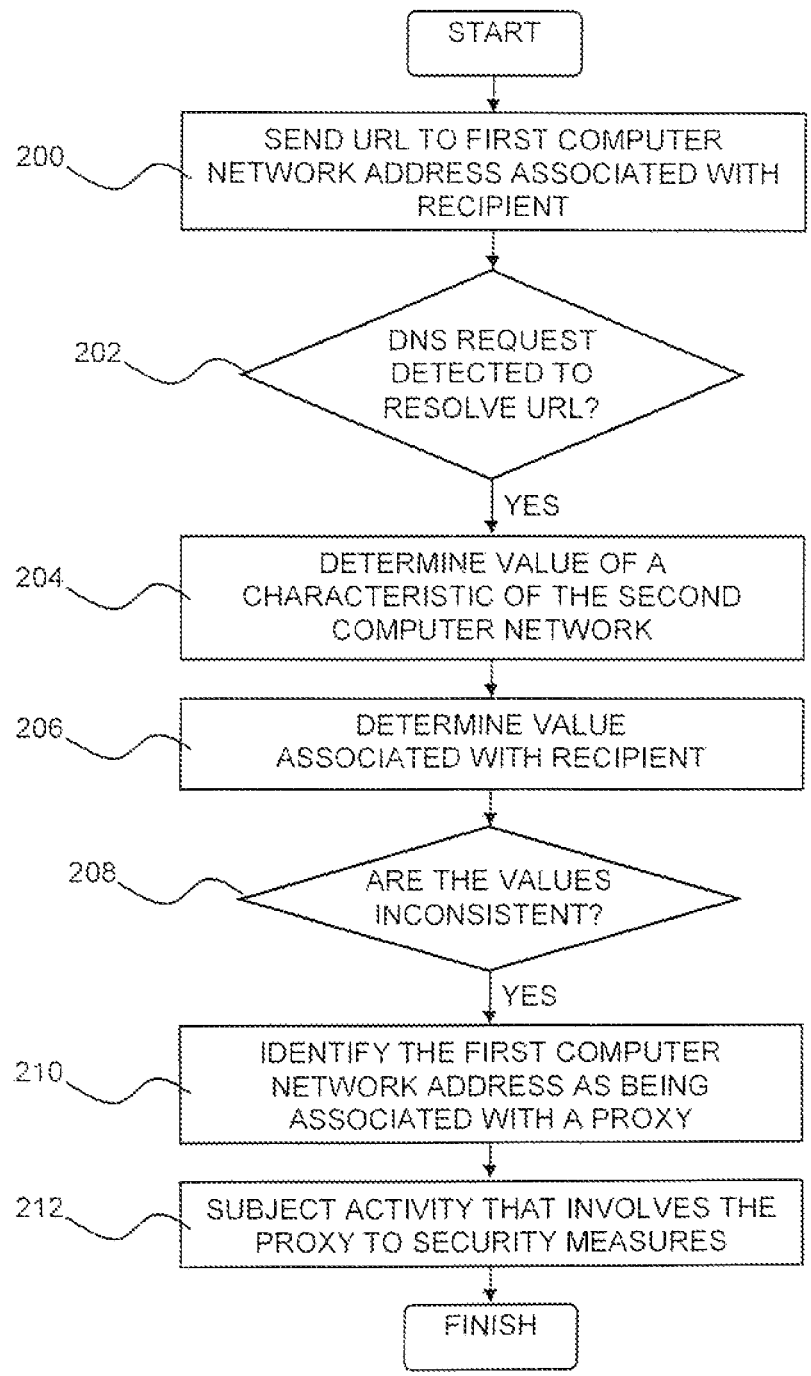
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, a URL is sent to a recipient at a first computer network address, via a computer network, such as the Internet (step 200). A request for DNS resolution of the hostname portion of the URL is detected, where the request is received from a second computer network address (step 202). A value of a characteristic of the second computer network address is determined (step 204), as is a value associated with the recipient (step 206). If the values are inconsistent (step 208), the first computer network address is identified as being associated with a proxy (step 210), whereupon activities that involve the proxy may be subject to additional security measures, such as by subjecting the activities to further scrutiny, curtailing the activities, or preventing the activities from being completed (step 212).

The system of FIG. 1 and method of FIG. 2 may be illustrated in the context of the following exemplary scenario in which:

A criminal in a foreign country uses a web browser on a client computer to log on to the web site of a victim's bank in Chicago, where the web browser communicates with the bank via a Socket Secure (SOCKS) proxy located in New York. Communications that the bank's web server receives from the client computer indicate a source Internet Protocol (IP) computer network address as the IP address of the SOCKS proxy in New York.

A web page is provided by the bank's web server to the criminal's browser. The bank's web server generates the web page to include a URL in the form of the HTML statement, e.g., <img src="https://29384628734628746234.images.somedomain.com/1x1.gif">, where the URL includes the identifier '29384628734628746234' that is uniquely associated with the victim's bank account and maintained by the bank's web server.

The bank, which owns the "somedomain.com" domain, uses a dedicated DNS server for resolving *.images.somedomain.com.

The criminal's web browser sends a request to the dedicated DNS server to resolve the hostname of the URL, which includes the identifier '29384628734628746234'. Since the criminal's web browser is using SOCKSv4, the request is NOT sent via the SOCKS proxy, but rather is sent via the DNS resolver of the criminal's Internet Service Provider (ISP) who is also located in the foreign country.

The dedicated DNS server responds to the request in accordance with conventional techniques, and separately provides a notification to the bank's web server including the hostname indicated in the request, as well as the IP address of the requestor (i.e., of the ISP's DNS resolver).

The bank's web server receives the notification and uses the hostname indicated in the notification to identify the victim's bank account that is associated with the corresponding URL.

The bank's web server determines the geolocation of the IP address of the DNS resolution request (i.e., of the ISP's DNS resolver), as well as the geolocation of the IP address of the criminal's client computer (i.e., IP address of the SOCKS proxy).

Although the IP address of the client computer appears to originate in New York, the IP address of the DNS request is found to originate in the foreign country. The bank's web server therefore determines that the client computer is communicating with the bank's web server via a proxy, and rejects requests received from the client computer, thereby preventing fraudulent access to the victim's bank account.

Figure 3:
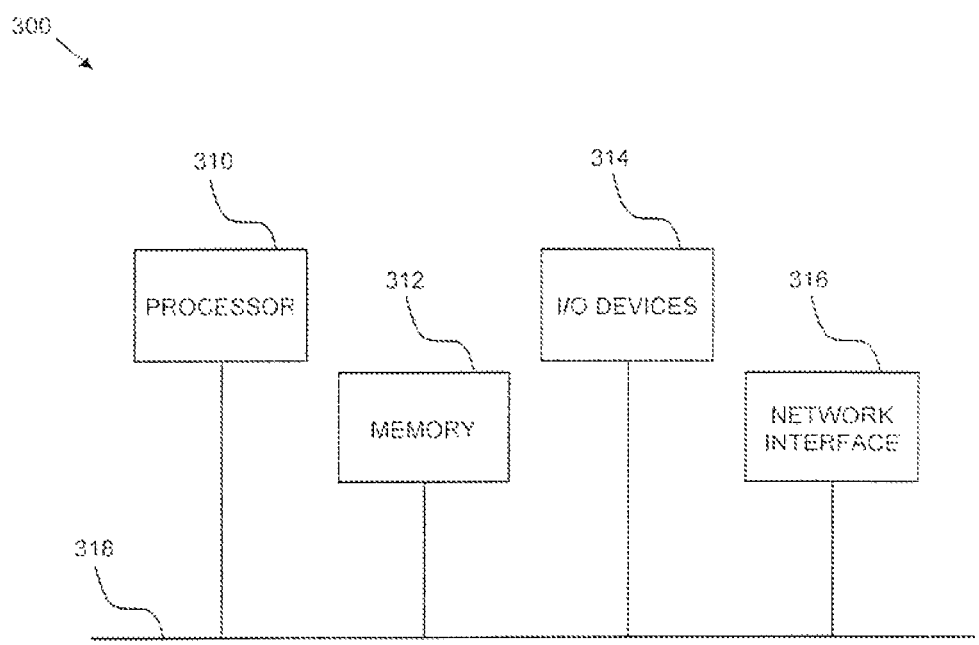
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Ruby, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting proxy-based communications via a computer network, the method comprising:
    sending a uniform resource locator, embedded with a dynamically generated identifier, via a computer network to a recipient at a first computer network address, wherein the dynamically generated identifier uniquely identifies one or more of the recipient, a client session, a client device and an account associated with the recipient;
    identifying, by one or more computer processors, a request associated with the uniform resource locator, wherein the request is associated with a second computer network address;
    determining, by one or more computer processors, that a first value of a characteristic of the second computer network address is inconsistent with a second value of the characteristic associated with the recipient, thereby identifying the first computer network address as being associated with a proxy based on the dynamically generated identifier; and
    subjecting a request received from the first computer network address to a security measure responsive to identifying the first computer network address as being associated with the proxy.

2. The method of claim 1, wherein sending the uniform resource locator comprises sending the uniform resource locator within a web page.

3. The method of claim 1, wherein the request associated with the uniform resource locator and the second computer network address is a request to resolve the uniform resource locator.

4. The method of claim 1, wherein identifying the request associated with the uniform resource locator comprises receiving a notification indicating the request, wherein the notification includes at least a portion of the uniform resource locator and the second computer network address.

5. The method of claim 1, wherein the first value and the second value of the characteristic are any of geolocation information, address ownership information, and domain level information associated with the first and second computer network addresses.

6. The method of claim 1, wherein determining that the first value of the characteristic of the second computer network address is inconsistent with the second value associated with the recipient comprises determining that the second computer network address is inconsistent with at least one computer network address associated with a request associated with a previous uniform resource locator that was previously provided to the recipient.

7. A system for detecting proxy-based communications via a computer network, the system comprising:
    a communications manager configured to send a uniform resource locator, embedded with a dynamically generated identifier, via a computer network to a recipient at a first computer network address, wherein the dynamically generated identifier uniquely identifies one or more of the recipient, a client session, a client device and an account associated with the recipient;
    a proxy detector configured to:
    identify a request associated with the uniform resource locator, wherein the request is associated with a second computer network address, and
    determine that a first value of a characteristic of the second computer network address is inconsistent with a second value of the characteristic associated with the recipient, thereby identifying the first computer network address as being associated with a proxy based on the dynamically generated identifier; and
    a security manager configured to:
    subject a request received from the first computer network address to a security measure responsive to the identification of the first computer network address as being associated with the proxy.

8. The system of claim 7, wherein the communications manager is configured to send the uniform resource locator within a web page.

9. The system of claim 7, wherein the request is a request to resolve the uniform resource locator.

10. The system of claim 7, wherein the proxy detector is configured to receive a notification indicating the request, wherein the notification includes at least a portion of the uniform resource locator and the second computer network address.

11. The system of claim 7, wherein the first value and the second value of the characteristic are any of geolocation information, address ownership information, and domain level information associated with the first and second computer network addresses.

12. The system of claim 7, wherein the proxy detector is configured to determine that the second computer network address is inconsistent with at least one computer network address associated with a request associated with a previous uniform resource locator that was previously provided to the recipient.

13. The system of claim 7 wherein the communications manager, the proxy detector and the security manager are implemented in any of
    a) computer hardware, and
    b) computer software embodied in a non-transitory, computer-readable medium.

14. A computer program product for detecting proxy-based communications via a computer network, the computer program product comprising:
    one or more non-transitory computer readable storage media; and computer-readable program code embodied in the one or more non-transitory computer readable storage media, wherein the computer-readable program code is configured to:

send a uniform resource locator, embedded with a dynamically generated identifier, via a computer network to a recipient at a first computer network address, wherein the dynamically generated identifier uniquely identifies one or more of the recipient, a client session, a client device and an account associated with the recipient, identify a request associated with the uniform resource locator, wherein the request is associated with a second computer network address, determine that a first value of a characteristic of the second computer network address is inconsistent with a second value of the characteristic associated with the recipient, thereby identifying the first computer network address as being associated with a proxy based on the dynamically generated identifier, and subject a request received from the first computer network address to a security measure responsive to identifying the first computer network address as being associated with the proxy.

15. The computer program product of claim 14, wherein the computer-readable program code configured to identify the request associated with the uniform resource locator comprises computer-readable program code configured to:

receive an indication of the request including at least a portion of the uniform resource locator; and based on at least an identifier included in the portion of the uniform resource locator, identify a second computer network address associated with the identifier.

* * * * *